(No Model.) 7 Sheets—Sheet 1.
A. H. FANCHER.
COIN RELEASED WEIGHING SCALES OR OTHER COIN ACTUATED MECHANISM.

No. 424,770. Patented Apr. 1, 1890.

WITNESSES:
John Becker
Fred White

INVENTOR:
Alton H. Fancher,
By his Attorneys,
Arthur G. Fraser & Co.

(No Model.) 7 Sheets—Sheet 3.

A. H. FANCHER.
COIN RELEASED WEIGHING SCALES OR OTHER COIN ACTUATED MECHANISM.

No. 424,770. Patented Apr. 1, 1890.

WITNESSES:
John Becker
Fred White

INVENTOR:
Alton H. Fancher,
By his Attorneys,
Arthur E. Brasier & Co.

(No Model.) 7 Sheets—Sheet 4.

A. H. FANCHER.
COIN RELEASED WEIGHING SCALES OR OTHER COIN ACTUATED MECHANISM.

No. 424,770. Patented Apr. 1, 1890.

WITNESSES:
John Becker
Fred White

INVENTOR:
Alton H. Fancher,
By his Attorneys,
Arthur G. Fraser &Co (No Model.) 7 Sheets—Sheet 5.

A. H. FANCHER.
COIN RELEASED WEIGHING SCALES OR OTHER COIN ACTUATED MECHANISM.

No. 424,770. Patented Apr. 1, 1890.

WITNESSES:
John Becker
Fred White

INVENTOR:
Alton H. Fancher
By his Attorneys,
Arthur C. Fraser & Co.

(No Model.) 7 Sheets—Sheet 6.
A. H. FANCHER.
COIN RELEASED WEIGHING SCALES OR OTHER COIN ACTUATED MECHANISM.

No. 424,770. Patented Apr. 1, 1890.

WITNESSES:
John Becker
Fred White

INVENTOR:
Alton H. Fancher,
By his Attorneys,
Arthur E. Fraser & Co.

(No Model.) 7 Sheets—Sheet 7.

A. H. FANCHER.
COIN RELEASED WEIGHING SCALES OR OTHER COIN ACTUATED MECHANISM.

No. 424,770. Patented Apr. 1, 1890.

FIG. 16.

WITNESSES:
John Becker
Fred White

INVENTOR:
Arthur H. Fancher,
By his Attorneys,
Arthur E. Fraser & Co.

UNITED STATES PATENT OFFICE.

ALTON H. FANCHER, OF BROOKLYN, NEW YORK.

COIN-RELEASED WEIGHING-SCALES OR OTHER COIN-ACTUATED MECHANISM.

SPECIFICATION forming part of Letters Patent No. 424,770, dated April 1, 1890.

Application filed September 4, 1889. Serial No. 322,966. (No model.)

*To all whom it may concern:*

Be it known that I, ALTON H. FANCHER, a citizen of the United States, residing in Brooklyn, in the county of Kings and State of New York, have invented certain new and useful Improvements in Coin-Released Weighing-Scales and other Coin-Actuated Mechanisms, of which the following is a specification.

This invention relates specifically to weighing-scales which are normally locked or otherwise rendered inoperative, and which are unlocked or rendered operative by the insertion of a coin into a suitable coin-actuated device forming a part of or attachment to the scale. Such scales or weighing-machines have heretofore been made operative in various ways through the action of a coin; but, so far as I am aware, all such scales have been of the class of automatic scales, or those which indicate automatically (after the insertion of the coin) any weight placed upon the platform, in contradistinction to scales in which it is necessary to shift a weight or poise along a scale-beam in order to counterbalance the weight deposited on the platform. Scales of the latter class are well known to be more accurate and less liable to get out of order than automatic scales, since the latter rely upon the distention or compression of a spring to counterbalance the weight on the platform, or upon a series of small weights linked together, more or less of which are lifted by the depression of the platform.

It is one object of my invention to provide a scale of the non-automatic class which shall be normally locked or inoperative, but which may be unlocked and rendered capable of use for one weighing operation by means of the deposit of a coin in a coin-actuated locking device applied to or forming part of the scale.

My invention in its broader aspect is applicable not merely to weighing-scales, but to other mechanisms in which a coin is employed for the purpose of operating any moving part in the nature of a lock or detent, or any other element or instrumentality to which it may be desired to communicate motion.

My invention introduces a new principle in apparatus which are actuated through the medium of a coin. I construct the apparatus with any suitable casing, having, as usual, an opening or duct for the insertion of a coin, and I provide means for forcibly moving an inserted coin through a predetermined path within the casing. In addition I provide a moving part movable in lateral direction relatively to the path of the coin and normally projecting slightly into its path, so that the forcible movement of the coin displaces such part by means of a lateral or cam-like thrust. The movement of the coin is edgewise or in its own plane—that is to say, in a plane coincident to the plane of extension of the coin, in contradistinction to the coin being moved flatwise, or in a direction perpendicular to the plane of the coin. The forcible movement of the coin is effected, preferably, by means of a movable part, which I call the "coin-carrier," and which has a recess into which the coin enters to a greater or less distance. Preferably the coin enters only partially into this recess, leaving a portion of its diameter projecting sufficiently to form a sort of cam, and this projecting portion or cam effects the displacement of the moving part referred to; hence the movement of the carrier is effective to displace this moving part only when a coin has been dropped in and has been carried by it. The moving part is made to act as, or to impart motion to, the device which is to be actuated by the agency of the coin, such as a bolt for locking a scale-beam or for locking a door or drawer, or a detent for arresting the moving parts of a mechanism, or, as in the case of a vending-machine, a pusher for thrusting out the article to be sold. Provision is made for getting rid of the coin after it has done its work as the cam, it being then conducted to a money drawer or receptacle. Various auxiliary devices are also provided for perfecting the mechanical operation and for restoring the displaced parts to their original positions.

My invention provides a means of utilizing the coin as an agent for actuating mechanisms in such way as to secure a positive action, to avoid liability of getting out of order, and to guard against attempts to defraud or tamper with the apparatus.

The novel principle introduced by my invention is capable of being applied in various ways and is applicable to various purposes.

In the accompanying drawings I have shown both the preferred construction of my invention as applied to weighing-scales and some modifications thereof illustrative of other uses of which it is susceptible.

I will first describe a construction of coin-released lock applicable to weighing-scales, as illustrated in Figs. 1 to 7, inclusive.

Figures 1, 7:
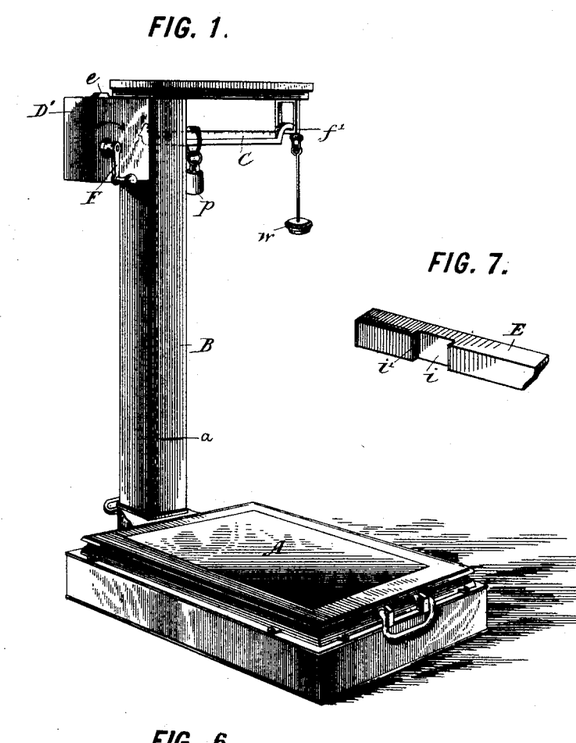
Figure 1 is a perspective view of my new coin-locked weighing-scale.
Fig. 7 is a perspective view of the locking-bolt. The remaining views illustrate modifications.
Figures 2, 3:
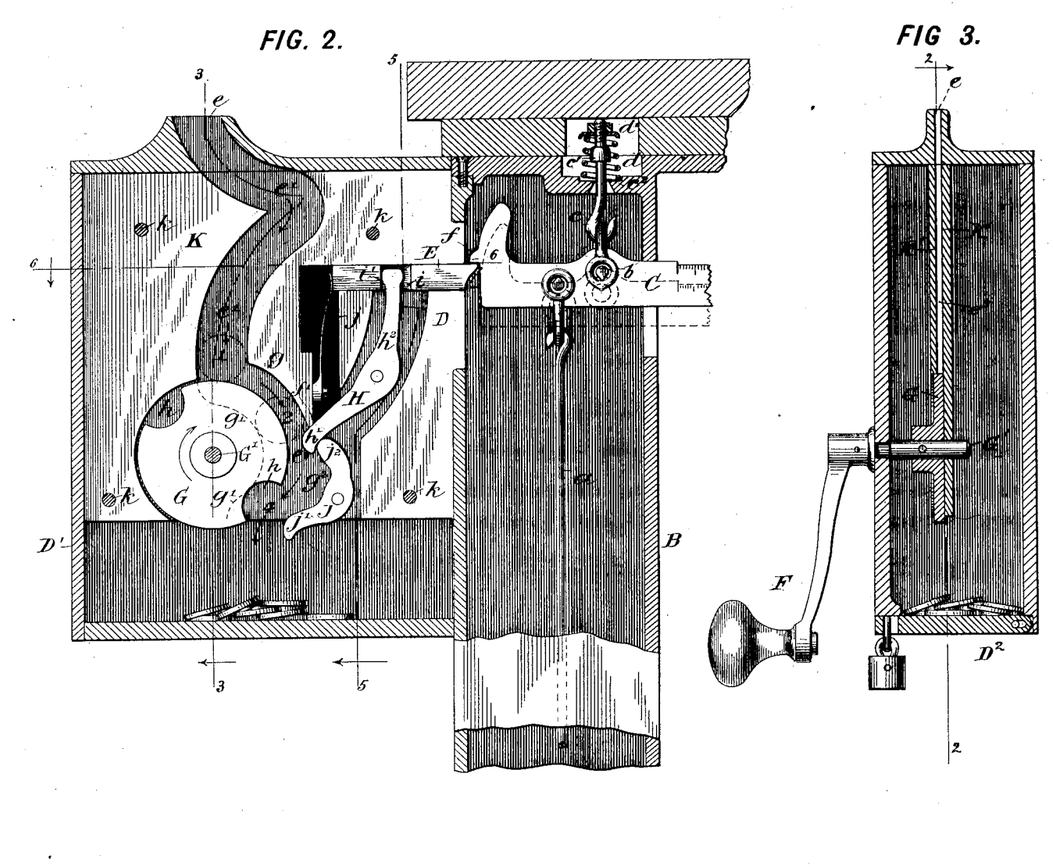
Fig. 2 is a fragmentary vertical section of the essential parts thereof on a larger scale, the plan of the section being approximately coincident with the front side of the scale-beam, or, more exactly, in the plane of the line 2 2 in Fig. 3.
Fig. 3 is a vertical transverse section of the coin-actuated lock in the plane of the line 3 3 in Fig. 2.
Figures 4, 5:
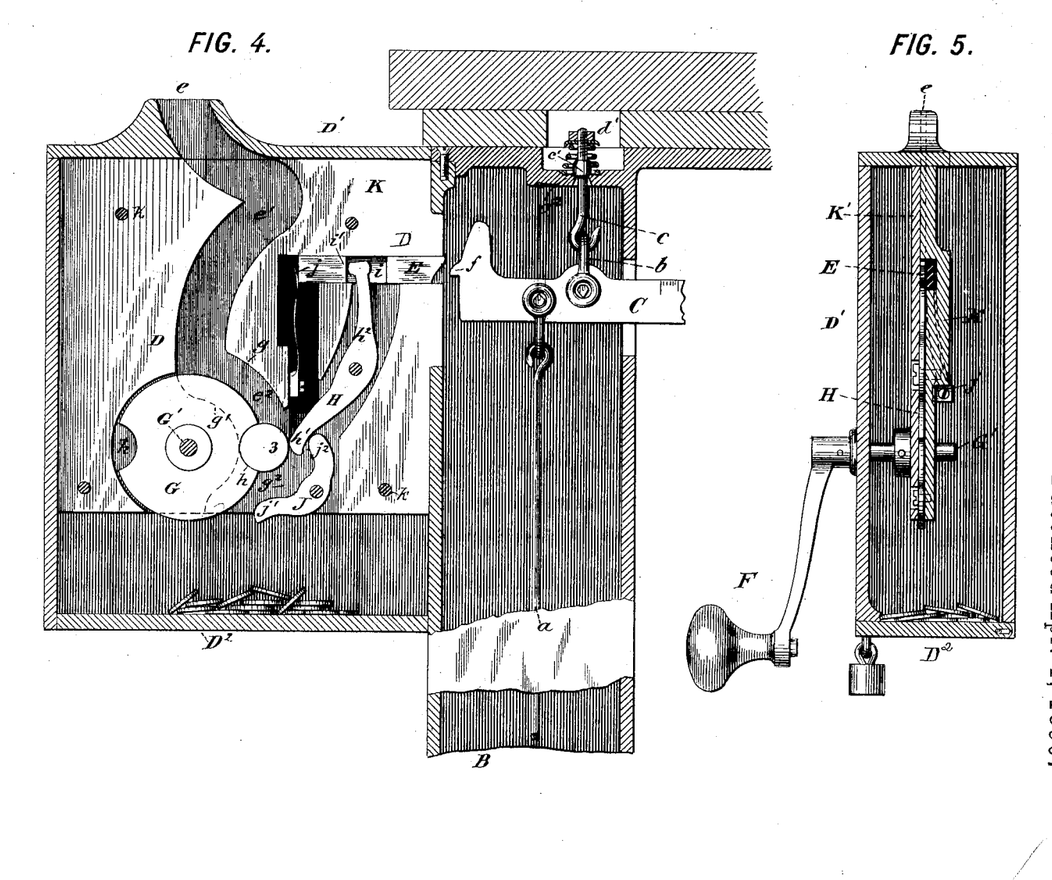
Fig. 4 is a view corresponding to Fig. 2, but showing the parts in a different position.
Fig. 5 is a vertical transverse section in the plane of the line 5 5 in Fig. 2.

Referring to Fig. 1, let A designate the usual platform of a weighing-scale, which is mounted, as usual, on compound levers through the medium of knife-edges, the terminal lever connecting to a steelyard-rod, (shown in dotted lines at $a$,) which extends up through the standard B, and is hung at its upper end from the scale-beam C, in the manner best shown in Figs. 2 and 4. The scale-beam has the usual counter-weight $w$ and adjustable poise $p$, common to all ordinary platform-scales. It is fulcrumed, as usual, by being hung from a link $b$, depending from a hook $c$, with this difference, however, that in the construction shown this hook is movable up and down, being pressed upwardly by a spring $d$ of sufficient strength to lift the scale-beam bodily when there is no weight upon the platform A. The tension of this spring should be so adjusted through the medium of the nut $d'$, screwing on the upper end of the hook $c$, that as soon as the lightest weight which the scale is designed to weigh is placed on the platform A this spring will yield and the hook will be drawn down until its shoulder $c'$ rests solidly on the ledge or support $c^2$, which forms part of the standard or framing B of the scale. The scale-beam then hangs from a fixed fulcrum, or one of invariable position.

D is the coin-released locking apparatus by which the scale is normally rendered inoperative. It consists of an inclosing-casing D', fastened to the standard B and formed with a slot or aperture $e$ in its upper side for the insertion of a coin and with the coin-actuated mechanism in this casing terminating in a locking-bolt E, the end of which when in its normal or locked position projects into the path of a tooth or shoulder $f$ on the scale-beam, as shown in Fig. 2. When the bolt is in this position, if a person desiring to weigh himself steps on the platform A, his weight pulling downward on the steelyard-rod $a$ will draw down on the scale-beam and pull the shoulder $f$ down against the bolt E, whereupon the scale-beam will rock on the bolt as a fulcrum until its outer end strikes the usual stop $f'$, (shown in Fig. 1,) where the beam will remain, it being impossible for the scale to be used for weighing purposes while in this condition.

In order that the scale may be used, it is necessary that the bolt E should be withdrawn so as to clear the shoulder $f$, whereupon the weight of the person or other thing to be weighed, pulling down through the steelyard-rod $a$, draws down the scale-beam until the shoulder $c'$ reaches its seat $c^2$, as shown in Fig. 4, whereupon by adjusting the poise $p$ the scale-beam may be balanced to the exact weight, as in the use of any ordinary weighing-scale. This withdrawal of the bolt E is effected by dropping a coin into the coin-slot $e$ and then turning a crank F in the direction of the arrow marked on the front of the box in Fig. 1. Before the completion of one revolution of this crank the scale will be found to be unlocked and the person using it may then proceed to take the weight.

From the exterior coin slot or opening $e$ a coin duct or conduit $e'$ leads down within the casing, being preferably curved circuitously, as shown in Fig. 2, in order to prevent tampering with the machine by introducing a strip of metal or a piece of wire. This conduit extends downward until it encounters a disk or rotary carrier G, whereupon the conduit is continued in the arc of a circle extending around this disk concentrically with its axis of rotation, as denoted by the full lines $g$ and dotted lines $g'$ $g^2$ in Fig. 4, this latter or arc-shaped portion of the conduit being lettered $e^3$. The conduit preferably extends in a vertical plane, as shown in Fig. 3, where the section is taken through the conduit $e'$. Thus the coin in moving through the conduit follows a predetermined path and moves edgewise or in the direction of its own plane. The conduit may be more or less twisted or diverted, so as to vary somewhat the plane of the path through which the coin moves; but this is not material.

The carrier G consists of a disk fixed on a shaft G', which is mounted in rotary bearings, as clearly shown in Fig. 3, and the front end of which extends out through the front of the case D' and has fixed on it the crank F, by turning which the carrier G is rotated. The carrier G is formed with one, two, or more peripheral notches $h$ $h$, two being shown, and these notches in the construction shown being of such shape and depth as to receive about one-half the diameter of the prescribed coin by which the mechanism is to be operated—say, for example, a nickel five-cent piece or a copper cent. Thus when a prescribed coin is dropped into the slot $e$ it runs down the duct $e'$ and stands against the periphery of the carrier-disk G in the position indicated by the dotted circle marked 1 in Fig. 2. As the carrier is rotated in the direction of the arrow, one of the recesses $h$ comes under the coin and the coin drops into it and is carried around with the carrier, being thereby moved through the branch or secondary duct $e^2$, as indicated by the dotted circle marked 2 in Fig. 2, its escape from the recess $h$ being prevented by the arc-shaped wall $g$ of the duct. The duct outline marked $g'$ is an imaginary outline, being determined by the bottom of the recess $h$. As the coin is thus carried around with the carrier, it projects for about half its diameter beyond the periphery thereof, and this projecting portion constitutes what is essentially a cam.

A moving part or movably-mounted part H, which in the construction shown is in the form of a lever, projects partly into the path of the coin—that is to say, into the coin-conduit $e^2$—this projecting portion being marked $h'$. The portion of the moving part or lever thus projecting into the path of the coin is freely movable in direction transversely to the direction of the movement of the coin—that is to say, not essentially perpendicular thereto, but in a direction approximately across the direction of movement of the coin, so that as the coin is carried around by the carrier its projecting or cam portion encounters this projecting end $h'$ of the moving part H and forces the latter out of the way, thus tilting the lever H from the position shown in Fig. 2 to that shown in Fig. 4, where the position of the coin at this instant is indicated by the number 3. The movement thus imparted to the lever H may be utilized in any way for the operation of any device to be actuated by coin-operated mechanism.

In the specific construction shown the upper arm $h^2$ of the lever H extends up to and engages the bolt E in such manner that by the displacement of the lever H through the action of the coin the bolt E is withdrawn, as shown in Fig. 4. In the construction shown the bolt E is a square bar of metal with a wide notch or recess $i$ on one side, into which the upper end of the lever-arm $h^2$ projects, so that it normally stands in contact with the shoulder or wall $i'$ of this recess. The bolt is mounted in sliding bearings, so that it moves freely, and it is normally protruded by a spring $j$, arranged to press against its rear end. The further movement of the coin brings it against the tail $j'$ of a restoring-lever J, which tail, when the lever H is in its tilted position, (shown in Fig. 4,) projects into the path of the coin, so that as the coin reaches the position shown at 4 in Fig. 2 it tilts the lever J back from the position shown in Fig. 4 to that shown in Fig. 2, whereupon the opposite arm $j^2$ of this lever by acting against the arm $h'$ of the lever H restores the latter to its normal position. As soon as the coin passes beyond the position shown at 4 in Fig. 2 it drops out of the recess $h$ and falls into the coin receptacle or space in the bottom of the case D. The coins may be removed from this box at intervals by opening a door $D^2$ at the bottom, which is normally locked through the medium of a padlock or other suitable key-actuated lock, which may be opened only by the proprietor of the apparatus or his agent or cashier. When the lever H is thus tilted back by the lever J to its first position, the bolt E is freed and is permitted to be thrust outward again by its spring $j$. The principal advantage of thus mechanically restoring the lever H is to relieve the spring $j$ of the work of moving back this lever, so that this spring may be a light spring, having no other work to do than to move the bolt E, which slides very easily.

In the normal operation of the apparatus the person desiring to weigh himself should first step upon the platform A, either before or after depositing the coin, and should then turn the crank F, whereby the bolt E is withdrawn through the action of the coin, in the manner already described. As soon as the withdrawal of the bolt releases the scale-beam C, the latter descends to the position shown in Fig. 4, its shoulder $f$ being sufficiently below the engaging portion or beak of the bolt to be able to move or rock to the slight extent necessary for the weighing operation without bringing its shoulder $f$ into contact with the bolt, even though the latter may immediately be reprojected into the position shown in Fig. 2, this result being apparent by a comparison of the dotted-line position of the beam in Fig. 2 with the position of the bolt. The bolt will be thus reprojected as soon as the lever H is restored by the lever J, and the too great projection of the bolt will be prevented by any suitable stop—as, for example, by the abutment of its shoulder $i'$ against the lever H and the abutment of the latter against the shoulder $f'$, as shown in Fig. 2. When the user steps off the platform, the spring $d$ lifts the scale-beam to its original position, thereby causing the shoulder or tooth $f$ to wipe past the end of the bolt, forcing the latter back for an instant in so doing, and upon passing it the bolt is thrust out again beneath the shoulder by the action of its spring $j$, thereby leaving the parts in the positions they occupied before the operation.

Figure 6:
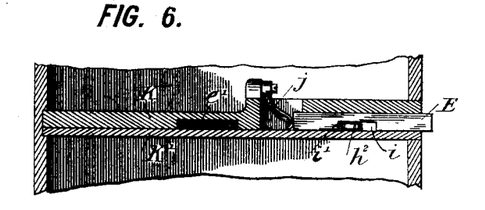
Fig. 6 is a fragmentary horizontal section taken on the line 6 6 in Fig. 2.

The coin-duct $e'$ $e^2$ is preferably constructed by means of two flat plates K and K', arranged within the casing D', as shown in Figs. 3, 5, and 6. These two plates fit together face to face, the coin-duct being formed between them, and, preferably, wholly in one of the plates—that is, in the plate K in the construction shown—by milling out a shallow groove in this plate to the requisite depth—that is, to a depth slightly greater than the thickness of the coin—as clearly shown at $e'$ in Fig. 6. The circular space for the carrier G to turn in is also milled out in the same manner in the plate K and cut entirely through the plate K'. Spaces for the levers H and J to move in are formed by milling out in like manner, and these levers are made by stamping out from flat metal plate of about the same thickness as the coin. The bolt E moves in a groove milled or planed out in the plate K. When the plate K' is applied against the face of the plate K, the conduit $e'$ $e^2$, the spaces for the levers H and J, and the channel for the bolt E are all closed, thereby preventing any escape or displacement of the parts. The plates K and K' are fastened together by screws $k$ $k$ in Fig. 2. The spring $j$ is fastened to a lug on the back of the plate K and works in a slot cut through this plate. These constructions, although well adapted for the purpose, may be readily modified without departing from my invention.

In the construction of the coin-actuated lock for weighing-scales already described it is necessary for the person or other weight to be weighed to be already placed upon the platform before the crank is turned, as otherwise the lock will be unlocked and then will relock the scale-beam, it being necessary that there should be a weight tending to pull the scale-beam down to the position shown in Fig. 4, in order that it shall be unlocked and remain so until one weighing has been effected.

Figure 8:
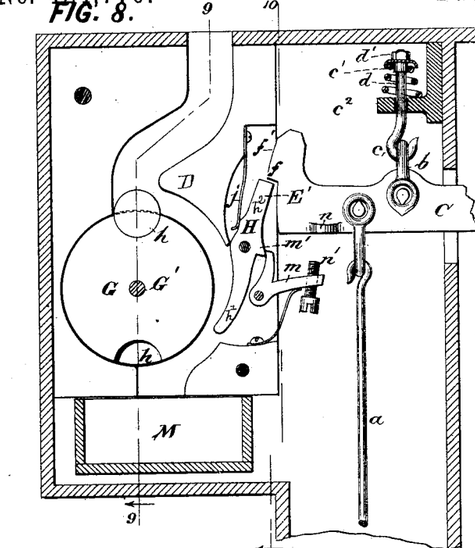
Figs. 8 and 9 correspond, respectively, to Figs. 2 and 3.
Figure 9:
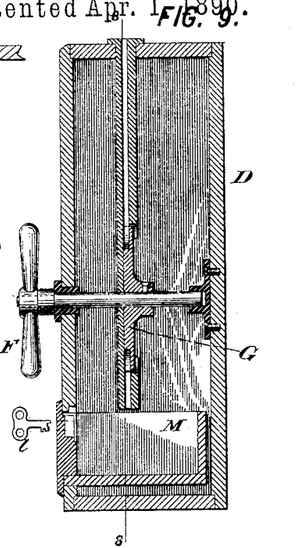
Figure 10:
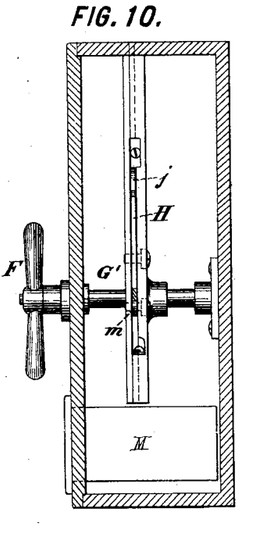
Fig. 10 is a vertical transverse section on the line 10 10 in Fig. 8, and looking toward the left.
Figure 11:
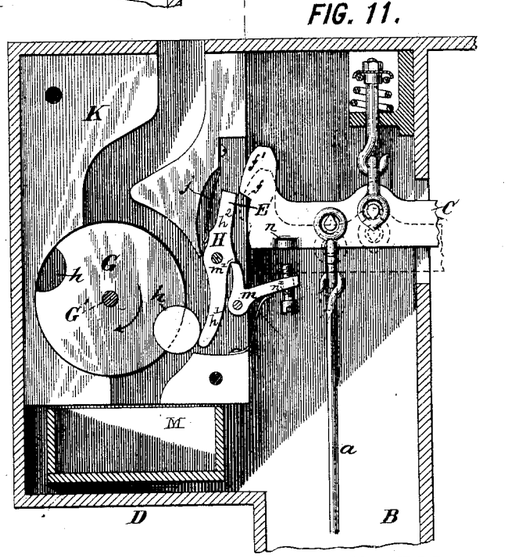
Fig. 11 is a similar view to Fig. 8, showing the parts in a different position.

I will now proceed to describe a modified construction whereby this result, if considered objectionable, may be avoided. In the construction shown in Figs. 8 to 11 the scale-beam C is suspended, as before, from a hook $c$, upheld by a spring, which is drawn down to bring the hook to a solid seat when the weight is placed on the platform. The coin-actuated lever H constitutes the locking device, its upper end E' taking the place of the bolt E in the first construction, and being normally pressed up by a spring $j$, in order to automatically engage the shoulder $f$ on the scale-beam. The rotation of the carrier G after the coin has been inserted tilts the lever H from the position shown in Fig. 8 to that shown in Fig. 11, thereby freeing the shoulder $f$ from the lock or catch E'. The latter is held from springing back into engagement with the shoulder $f$ by means of a spring-catch lever $m$, the end of which engages a shoulder $m'$ on the lever H, as shown in Fig. 11. This lock may be operated by dropping in the coin and turning the handle F (equivalent to the crank F in Fig. 3) before stepping on the scale-platform, the lock remaining thus unfastened until the weight is deposited on the platform, whereupon it will draw down the scale-beam to the position shown in dotted lines in Fig. 11, and by so doing a shoulder $n$ on the scale-beam will strike a screw $n'$ in the tail of the lever M and tilt the latter enough to release the shoulder $m'$, whereupon the lever H will fly back under the tension of the spring $j$ toward its normal position, its upper end E' coming against an arc-shaped face $f'$ on the scale-beam. When the person being weighed steps off the platform and the spring $d$ draws up the scale-beam again, the shoulder $f$ moves high enough to clear the latch E', and the latter springs under it, as shown in Fig. 8, thereby relocking the scale-beam.

Figure 12:
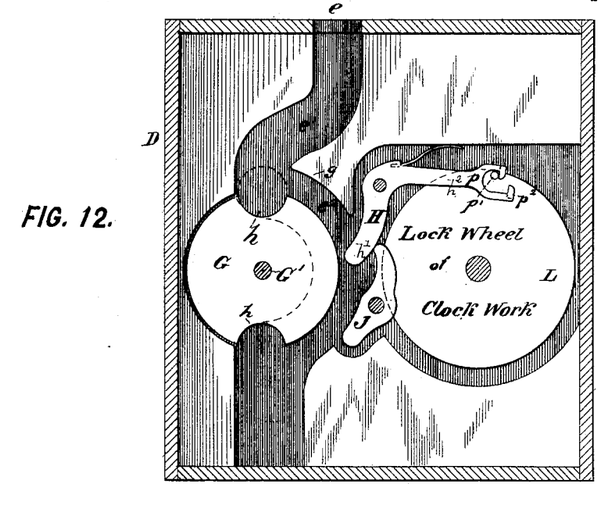
Fig. 12 is a similar view to Fig. 2, but illustrating the application of a further modification of my invention to the starting and stopping of clock-work movements.

Fig. 12 shows my invention as applied to a lock or detent for clock-work mechanisms. The lever H carries an anchor $p$, which engages a pin $p'$ on a locking-wheel L, this wheel being one of the wheels of a clock work or train. When by the action of a coin the lever H is tilted so as to lift the anchor $p$, the pin $p'$ is released and the wheel L moves forward until this pin strikes the second tooth $p^2$ of the anchor. Immediately thereafter the coin rocks the restoring-lever J, thereby bringing the lever H back to its original position, so that the pin $p'$ is released from the tooth $p^2$ and the wheel L makes a revolution, at the end of which the pin is stopped by abutment against the upper tooth of the anchor.

Figure 13:
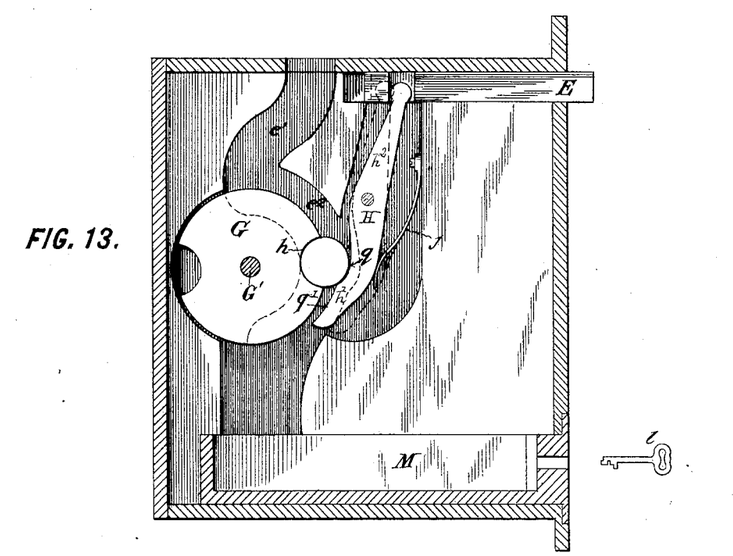
Fig. 13 is a similar view illustrating the application of a further modification of the invention to a coin-actuated door-lock.

Fig. 13 shows my invention as applied to a lock for doors—such, for example, as the doors of telephone-cabinets or of water-closets. The bolt E is operated by the upper arm of a lever H, which is acted upon by a spring $j$ to restore the lever and protrude the bolt. The shaft G' will pass through the door and form the spindle of the ordinary door-knob. By dropping in a coin and then turning the door-knob until the coin is brought against the incline $q$ on lever H this lever will be vibrated to the position shown in dotted lines, and the bolt E thereby drawn back, whereupon by pulling the knob the door may be opened. The bolt will remain drawn back as long as the coin remains in contact with the arc-shaped face $q'$.

In Figs. 8, 9, 10, 11, and 13, M is a drawer for receiving the coins after they have fallen from the carrier G. This drawer is locked by any ordinary lock, to be unlocked by the insertion of a special key, such as shown at $l$.

Figure 14:
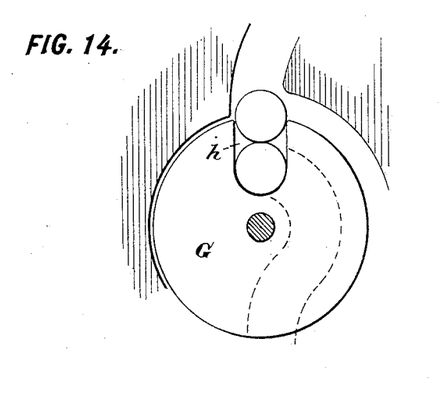
Figs. 14 and 15 are fragmentary views illustrating two other modifications.

In case it is desired to operate a coin-actuated mechanism according to my invention by means of two coins instead of one, the carrier G may be made, as shown in Fig. 14, with the recess of a depth greater than the diameter of one coin, so that the first coin dropped in will fall to the bottom of this recess and the second coin will partly enter the recess and partly project therefrom to form a cam.

Figure 15:
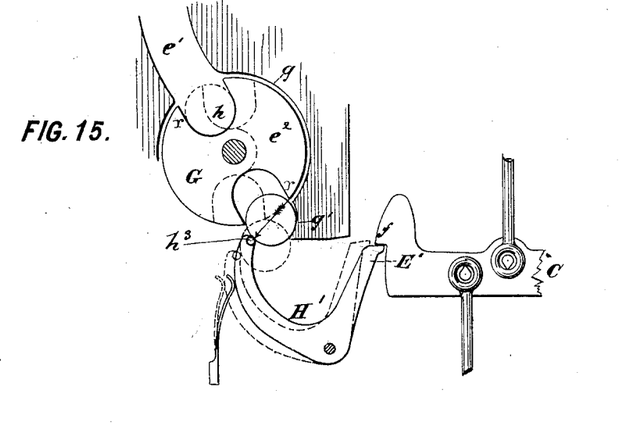

My invention may be in part availed of in an apparatus so constructed that the coin does not project from the carrier and by such projection act, after the manner of a cam, to effect a lateral displacement of some part standing in the path of this projecting portion. In lieu thereof the coin may be carried around by the carrier without effecting any result until it reaches such a position that it may partly emerge from the recess, at which instant it may encounter a movable part standing in its path, and by the continued rotation of the carrier may be thrust or pushed against this movable part, so as to effect a displacement of the latter. Fig. 15 shows such a construction. The recess in the carrier G is of a depth just equal to the diameter of the prescribed coin, so that the latter does not project out beyond the recess, and the outer or guiding wall $g$ of the portion $e^2$ of the coin-conduit is consequently arranged close to the outer periphery of the disk G, to prevent the escape of the coin from the recess when being carried around by the rotation of the disk. When the recess is brought to the lower side of the disk, so that the coin may drop out, this wall $g$ is carried away from the disk at $g'$, as clearly shown, in order to enable the coin to drop about half out of the recess, whereupon it is supported by this wall on one side and on the other by contact with a pin $h^3$ on the end of a lever H'. The continued motion of the carrier G brings the edge or corner $r$ against the coin at a point about diametrically opposite the side of the coin which is in contact with the pin $h^3$, so that the thrust is transmitted through the coin, as indicated by the arrow, whereby the pin $h^3$ is displaced, thereby tilting the lever H' to the position shown in dotted lines. The coin then, being no longer supported by the wall $g'$, drops out as soon as the carrier G is relieved of thrust. The lever H' may have its opposite arm formed as a latch E' for locking a scale-beam C, or may be otherwise shaped or adapted for any other purpose to which the coin-actuated lock is to be put.

It is one important feature of my invention that the picking of or tampering with the coin-actuated mechanism by the insertion of a stick or wire is entirely prevented, since the thrust exerted from the coin-carrier through the coin against the moving part or lever H or H' is in such direction that it cannot be given by means merely of a wire or strip thrust into the conduit. This thrust takes place in the branch $e^2$ of the conduit, which departs in a direction approximately at right angles from the main conduit $e'$, and which extends thence in the arc of a circle, the thrust being exerted at any part of this branch conduit, and preferably at or below the middle thereof. In the construction shown in Fig. 15 the branch conduit is entirely filled by the carrier G, so that it would be impossible to thrust a wire through it, and in this case the conduit $e'$ need not be reverse curved, although in the other cases this reverse curving is preferable.

Figure 16:
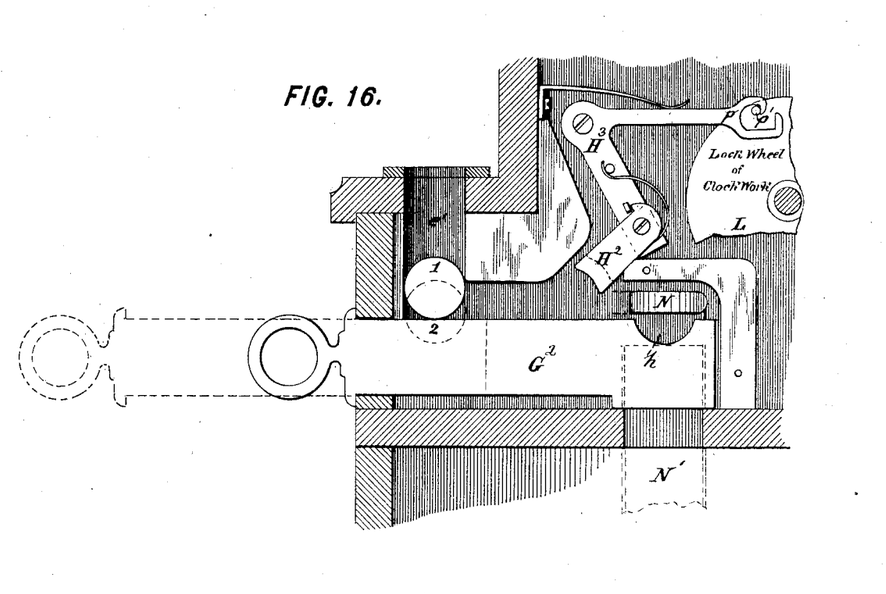
Fig. 16 is a sectional front elevation showing a further modification applicable to clock-work mechanisms.

The coin-carrier G, although preferably so mounted as to move in a circle or in the arc of a circle while carrying the coin, is not essentially so constructed. For example, it may move in a straight line, or in any other determinate path. In Fig. 16 it is shown as a slide $G^2$, movable out and in in a casing, as shown in dotted lines, and formed with a half-round recess $h$ for receiving the coin. The coin, being dropped into the conduit $e'$, rests on the slide in the position shown at 1. The slide is then to be pulled out to the position shown in dotted lines, whereupon the coin falls to the position shown at 2. The slide is then to be pushed back to the position shown in full lines, and in so doing the projecting portion of the coin encounters the movable part $H^2$, which in this case is a sliding part instead of a lever and displaces this part from the position shown in full to that shown in dotted lines. When the slide $G^2$ is fully restored, the coin is thrust out of the recess by a spring N, standing just over the slide, and which presses outwardly or toward the observer in the figure, thereby throwing the coin into a vertical conduit N', (shown in dotted lines,) down which it drops into any suitable cash-drawer or coin-receptacle. The movable part $H^2$ is pivoted to a lever $H^3$, the opposite arm of which has a locking-tooth or anchor $p$, engaging a pin $p'$ on the lock-wheel L of a clock-work mechanism in the same manner as shown in Fig. 12.

My improved coin-actuated mechanism cannot be operated by coins smaller than the prescribed coin, since the parts are so proportioned that a coin of smaller diameter will not move the movable or driven part to sufficient extent to effect the unlocking or accomplish whatever other purpose the mechanism is designed for.

I am aware that prior to my invention attempts have been made to construct coin-actuated devices in which the coin acted not merely by its weight or momentum, as is the case with most of the coin-actuated devices in use, but by a positive thrust exerted in some manner through the coin, so that the latter when inserted served as an intermedium for communicating motion from a manually-operated or driving part to a movable or driven part within the apparatus. In one such construction the inserted coin drops in between a rotatively-movable driving part and a rotatively-movable driven part, both mounted on the same axis, so that the coin serves to couple the two together, the coin being moved in the path of the arc of a circle, moving flatwise in contradistinction to edgewise. In another such mechanism the coin is dropped into a conduit, and a pusher or rammer then slides it along therein until it encounters a movable or driven part, which it thrusts ahead of it for a distance not exceeding the diameter of the coin. Several devices have been invented in which the coin is moved flatwise or through a path perpendicular to its plane, so that during the whole or some part of its movement it couples together the driving part, which moves it along, and the driven part, which normally is out of reach of the driving part. My invention is essentially distinguishable from all of these devices in the particulars hereinbefore sufficiently set forth, and more explicitly formulated in the claims.

By the expression relative to the movable or driven part that it is "capable of moving laterally to the path of the coin" I mean not that its movement is necessarily transverse to the direction in which the coin moves, but that is movable in such direction that it is capable of displacement by the thrust of the coin, and that by such displacement it moves either immediately or eventually out of the way of the coin, so that the latter frees itself from it and passes by it.

I claim as my invention the following defined novel features and combinations, substantially as hereinbefore specified, namely:

1. In a mechanism to be actuated or released by the insertion of a coin, the combination, with a casing having an opening or conduit for the insertion of a coin, of a carrier for receiving an inserted coin and forcibly moving it through a predetermined path within the casing, and a movable part capable of moving laterally to the path of the coin and normally projecting slightly into its path, whereby the movement of the coin past said part displaces it by a lateral or cam-like thrust.

2. In a mechanism to be actuated or released by the insertion of a coin, the combination, with a casing having an opening or conduit for the insertion of a coin, of a carrier for receiving an inserted coin and forcibly moving it through a predetermined path within the casing in its own plane, so that it moves edgewise, and a movable part arranged normally in the path of the coin and movable laterally thereto, to be displaced thereby by a lateral or cam-like thrust.

3. In a mechanism to be actuated or released by the insertion of a coin, the combination, with a casing having an opening or conduit for the insertion of a coin, of a carrier for receiving an inserted coin and forcibly moving it through a predetermined path within the casing in its own plane, so that it moves edgewise, and a movable part capable of moving laterally to the path of the coin and normally projecting slightly into its path, whereby the movement of the coin past said part displaces it by a lateral or cam-like thrust.

4. In a mechanism to be actuated or released by the insertion of a coin, the combination, with a casing having an opening or duct for the insertion of a coin, of a pivoted carrier for receiving an inserted coin adapted to move the latter through a predetermined arc, and a moving part movable laterally to the path of the coin and normally projecting slightly into its path, whereby the movement of the coin past said part displaces it with a lateral or cam-like thrust.

5. In a mechanism to be actuated or released by the insertion of a coin, the combination, with a casing having an opening or duct for the insertion of a coin, of a rotatively-pivoted carrier for receiving an inserted coin adapted to move the latter in the arc of a circle, and a movable part arranged normally in the path of movement of the coin and adapted to be displaced by contact therewith.

6. In a mechanism to be actuated or released by the insertion of a coin, the combination, with a casing having an opening or duct for the insertion of a coin, of a rotatively-pivoted carrier for receiving an inserted coin adapted to move the latter edgewise in its own plane in the arc of a circle, and a movable part arranged normally in the path of movement of the coin and adapted to be displaced by contact therewith.

7. In a mechanism to be actuated or released by the insertion of a coin, the combination, with a casing having an opening or duct for the insertion of a coin, of a carrier for receiving an inserted coin and moving it edgewise in its own plane through a predetermined path, and a lever projecting into the path of the coin and movable laterally thereto, whereby it is adapted to be displaced by the lateral or cam-like thrust of the coin.

8. In a coin-actuated mechanism, the combination of a movable coin-carrier having a recess into which the coin partly enters, leaving the remaining portion of the coin projecting to form a cam, and movable in the same plane as the coin, with a movable part projecting into the path of the projecting portion of the coin, whereby it is displaced by the cam-like action of the coin.

9. In a coin-actuated mechanism, the combination of a movable coin-carrier consisting of a rotatively-mounted disk having a recess for receiving the coin, adapted to hold the latter in a plane parallel to that of the disk and to move the coin edgewise by the rotation of the disk, and a moving part arranged normally in the path of movement of the coin and adapted to be displaced by contact therewith.

10. In a coin-actuated mechanism, the combination, with a coin-conduit, of a movable coin-carrier having a recess into which the coin may fall from said conduit, and a secondary coin-conduit forming a continuation of said conduit, extending parallel with the movement of the coin-carrier and of only sufficient width to admit of the passage of the coin, whereby the escape of the coin from the recess in the coin-carrier is prevented.

11. In a coin-actuated mechanism, the combination, with a primary coin-conduit, of a secondary coin-conduit forming a continuation thereof and extended in the arc of a circle, with a coin-carrier mounted to turn on an axis coincident with the center of said arc and movable to propel the coin through said secondary conduit.

12. In a coin-actuated mechanism, the combination, with a movable coin-carrier, of a primary coin-conduit extending to said carrier, and a secondary coin-conduit forming a continuation of the primary one and extending therefrom with an abrupt change of direction and in a path parallel with the movement of the coin-carrier, whereby the coin is carried through the secondary conduit by the movement of the carrier, and a movable part arranged in the path of movement of the coin, to be displaced thereby after it has entered the secondary conduit, whereby said part is inaccessible from the primary conduit.

13. In a coin-actuated mechanism, the combination, with a movable coin-carrier having a recess for receiving an inserted coin, of two plates joined together face to face, with a coin-conduit formed between said plates, and a chamber or space for the movement of the carrier, also formed between or in said plates, and said chamber and conduit relatively arranged, so that a coin dropped into the conduit may be propelled therethrough by the movement of the carrier.

14. In a coin-actuated mechanism, the combination, with a movable coin-carrier, of two plates joined together face to face, with a coin-conduit formed as a channel in one of said plates and closed by the other plate, and a chamber formed in said plate or plates, in which the carrier may move, having a marginal wall extending parallel with the movement of the carrier and adapted to prevent the escape therefrom of a coin carried thereby.

15. In a coin-actuated mechanism, the combination, with a casing and means for forcibly moving an inserted coin through a predetermined path within the casing, of a movable part standing in the path of the coin and adapted to be displaced by the coin in passing, and a second movable part arranged to be displaced by the coin and connected to said first-named part, and adapted when displaced to restore said first-named part into the path of the coin, ready to be acted on by the next coin.

16. In a coin-actuated mechanism, the combination, with a casing and a carrier for receiving an inserted coin and forcibly moving it through a predetermined path, of a lever arranged with its arm projecting into the path of the coin and to be displaced by the passage of the latter, and a second lever arranged to be displaced by the passage of the coin after it has acted on the first lever and connected to the first lever, whereby on its displacement it restores the first lever to its normal position.

17. A weighing-scale having a scale-beam and an adjustable and accessible poise thereon for counterbalancing the weight applied to the platform, combined with an inaccessible lock for normally engaging said beam to prevent its being used for weighing, and a coin-actuated releasing device for withdrawing said lock, so that upon the insertion of a coin the beam is freed and the poise may be operated.

18. The combination, with a scale-beam, of an elastic fulcrum therefor, adapted to lift the beam normally to a position higher than the weighing position, a bolt or catch for engaging the beam in its uplifted position, and a coin-actuated mechanism for withdrawing said bolt or catch and permitting the beam to be drawn down to be used for weighing.

19. The combination, with a weighing-scale, its beam having a locking-shoulder, of a bolt or catch normally engaging said shoulder to lock the beam, and a coin-actuated mechanism for withdrawing said bolt, consisting of a casing having an opening or conduit, a carrier for receiving an inserted coin and forcibly moving it through said casing, and a movable part arranged to be displaced by the passage of the coin and connected to said bolt to withdraw the latter by its displacement.

20. In a weighing-scale, the combination, with the beam C, having shoulder $f$, of spring $g$, for normally lifting the scale-beam when not in use, bolt E, for normally locking the beam, coin-conduit $e'$, coin-carrier G, and lever H, arranged to be displaced by the passage of the coin moved by said carrier and connected to the bolt to withdraw the latter by such displacement.

21. In a scale, the combination, with the beam C, having shoulder $f$, of locking-bolt E, spring $j$, for projecting it, coin-conduit $e'$, coin-carrier G, lever H, arranged to be displaced by the passage of the coin moved by said carrier and engaging said bolt to withdraw the latter by such displacement, and secondary lever J, arranged to be subsequently acted on by the passage of the coin and adapted to restore the lever H.

In witness whereof I have hereunto signed my name in the presence of two subscribing witnesses.

ALTON H. FANCHER.

Witnesses:
F. C. B. PAGE,
CHARLES WAGNER.